US011989167B1

(12) United States Patent
Wang et al.

(10) Patent No.: US 11,989,167 B1
(45) Date of Patent: May 21, 2024

(54) METHOD AND DEVICE FOR DETECTING AND CORRECTING ABNORMAL SCORING OF PEER REVIEWS

(71) Applicant: ZHEJIANG LAB, Zhejiang (CN)

(72) Inventors: Yihan Wang, Hangzhou (CN); Yiteng Zhai, Hangzhou (CN); Yao Yang, Hangzhou (CN); Jiaxi Yang, Hangzhou (CN); Yang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/489,879

(22) Filed: Oct. 19, 2023

(30) Foreign Application Priority Data

Nov. 28, 2022 (CN) .......................... 202211505028.1

(51) Int. Cl.
*G06F 16/215* (2019.01)
*G06F 16/22* (2019.01)

(52) U.S. Cl.
CPC ........ *G06F 16/215* (2019.01); *G06F 16/2246* (2019.01)

(58) Field of Classification Search
CPC .................. G06F 16/215; G06F 16/2246
USPC ......................................................... 707/692
See application file for complete search history.

(56) References Cited

U.S. PATENT DOCUMENTS

| 8,997,229 B1 * | 3/2015 | Huang | G06Q 50/01 709/224 |
| 2021/0184958 A1 * | 6/2021 | Kolar | H04L 43/08 |
| 2021/0281592 A1 * | 9/2021 | Givental | G06N 20/10 |
| 2023/0282316 A1 * | 9/2023 | Malvar Maua | G16C 20/80 706/12 |

(Continued)

FOREIGN PATENT DOCUMENTS

| CN | 105243508 A | 1/2016 |
| CN | 108564286 A | 9/2018 |
| CN | 111652514 A | 9/2020 |

(Continued)

OTHER PUBLICATIONS

First Office Action(CN202211505028.1); Date of Mailing: May 6, 2023.
Research-on-Abnormal-Data-Detection-in-Peer-Review—An-Example-of-Scientific-Project-Evaluation.

*Primary Examiner* — Cam Linh T Nguyen
(74) *Attorney, Agent, or Firm* — W&G Law Group (57) ABSTRACT

The present application disclose a method and a device for detecting and correcting abnormal scoring of peer reviews, which includes: converting collected scoring data into a two-dimensional matrix and preprocessing the data; determining the anomaly of the processed structured data with a one-way anomaly detection method, a consistency check method and a two-way anomaly detection method, and classifying the detected abnormal data into an abnormal data set; repairing the abnormal data for the abnormal data set with an information entropy correction method; generating an ability evaluation report according to the abnormal data set, performing weighed averaging on the corrected scoring data according to the scoring weights of reviewers in the ability evaluation report to obtain a final scoring result, and generating an abnormal scoring correction report. The present application can effectively detect the abnormal phenomenon of peer reviews in the performance appraisal of enterprise personnel.

7 Claims, 4 Drawing Sheets

(56) References Cited

U.S. PATENT DOCUMENTS

2024/0054211 A1* 2/2024 Xu .................... G06N 20/00

FOREIGN PATENT DOCUMENTS

| CN | 112836921 A | 5/2021 |
| CN | 114240230 A | 3/2022 |
| CN | 114281809 A | 4/2022 |
| CN | 114781840 A | 7/2022 |
| WO | 2019233189 A1 | 12/2019 |

* cited by examiner

METHOD AND DEVICE FOR DETECTING AND CORRECTING ABNORMAL SCORING OF PEER REVIEWS

CROSS-REFERENCE TO RELATED APPLICATIONS

The present application claims priority to Chinese Patent Application No. 202211505028.1, filed on Nov. 28, 2022, the content of which is incorporated herein by reference in its entirety.

TECHNICAL FIELD

The present application relates to an enterprise personnel assessment management system and in particular, to a method and a device for detecting and correcting abnormal scoring of peer reviews.

BACKGROUND

A peer review mechanism has been applied to internal personnel assessment management by more and more enterprises. On the one hand, enterprise managers can intuitively understand the working ability and status of different employees in the views of other colleagues through the results of mutual reviews; on the other hand, enterprise managers can aware another side they do not notice in their daily management through the results of mutual reviews, which is helpful to the development of enterprises. However, due to the quota limitation of bonus, promotion and other excess interests, the raters will have fraudulent practices such as "deliberately depressing scores" and "huddling together for common profits" out of consideration their own interests, which makes the scoring results abnormal. Therefore, how to determine the abnormal behavior in peer reviews is the key to ensure the fairness, impartiality and objectivity of peer reviews results.

At present, there are three methods to determine abnormal scoring. The first is to detect abnormal data based on statistics, which assumes that the distribution of data sets conforms to a certain distribution in advance, and then determine whether the data distribution is within the confidence interval with hypothesis testing methods, such as three times standard deviation detection based on normal distribution, Grubbs-based detection, t-based statistical detection, etc.; the second is to detect abnormal data based on distance, which calculates the distance between data objects through a distance function, and determines abnormal data points if the distance exceeds the distance threshold; the third is the density anomaly detection method, which, through the idea of a clustering algorithm, finds objects with relatively sparse density in space.

Furthermore, influenced by the reviewers' own preferences, professional ability and external environment, the reviewers may show inconsistency in the face of similar review objects. At present, the indicators used to measure this phenomenon include Kendall harmony coefficient, maximum ab solute deviation, coefficient of variation and average deviation.

However, there are more or less defects in the above methods for peer reviews mechanism. For example, regarding abnormal data detection based on statistics, it is necessary to obtain the distribution form of data, the number of parameters and the number of abnormal values in advance. In reality, the data distribution pattern usually does not conform to the standard distribution, and the data dimension of the research is highly required. Therefore, how to detect and correct the anomaly of multidimensional scoring data under the condition of unknown distribution is a technical problem to be solved by the present application.

SUMMARY

The object of the present application is to provide a method and a device for detecting and correcting abnormal scoring of peer reviews in view of the shortcomings of the prior art.

The object of the present application is achieved through the following technical solution: a first aspect of an embodiment of that present application provides a method for detecting and correcting abnormal scoring of peer reviews, including the following steps:

(1) Acquiring scoring data: collecting peer review data sets from an enterprise personnel performance appraisal database to obtain the scoring data, and performing structural transformation on original data information of the scoring data to obtain structured scoring data.

(2) Cleaning the scoring data: cleaning the structured scoring data obtained in the step (1) with a data cleaning method, in some embodiments, a data cleaning process includes data missing value filling and data normalization processing.

(3) One-way anomaly detection: performing one-way anomaly detection on each column of one-way scoring results in the structured scoring data, and adding detected abnormal data objects into a first abnormal data set.

(4) Consistency detection: performing consistency detection using a dispersion rate, and the adding detected abnormal data objects into a second abnormal data set.

(5) Two-way anomaly detection: performing two-way anomaly detection on the structured scoring data, and adding the detected abnormal data objects into a third abnormal data set.

(6) Abnormal data set repair: performing abnormal data repair for the first abnormal data set, the second abnormal data set and the third abnormal data set.

(7) Generating an evaluation report: the evaluation report includes a reviewer ability evaluation report and an abnormal scoring correction report.

Further, the original data information includes review time, reviewer number, reviewee number and scoring result.

Further, the data missing value filling specifically includes: calculating an average value from historical scoring data to replace missing values in a current period for filling.

The data normalization processing specifically includes the following steps: uniformly mapping the scoring data to [0, 1] intervals by using a maximum-minimum normalization method or a Z-score method, and arranging the scoring data in an ascending order by columns.

Further, the step (3) includes the following sub-steps:

(3.1) Constructing an index structure according to a data set of the structured scoring data, in some embodiments, the index structure is a Kd-tree.

(3.2) Outlier mining: firstly, establishing a query path, and determining whether to backtrack a current node by calculating a distance between a query node and a current nearest node; if the distance is less than or equal to a set distance threshold D, backtracking the current node until the distance between a backtrack node and the query node is greater than the set distance threshold D; secondly, determining outliers, counting a number m 1 of data objects contained in a D-neighborhood of current query node, and determining the current query node as an outlier if the number m 1 of data objects contained in the D-neighborhood is less than a threshold M; in some embodiments, the threshold M is a maximum number of data objects allowed to be contained in the D-neighborhood of the outlier.

(3.3) Repeating the step (3.2) to sequentially complete the one-way anomaly detection of each data object in each column in the structured scoring data, and adding the detected abnormal data objects into the first abnormal data set.

Further, the sub-step (3.1) includes the following sub-steps:

(3.1.1) Determining a segmentation domain S: calculating a variance of the data set in each dimension, and selecting a dimension with a largest variance as the segmentation domain S.

(3.1.2) Determining a segmentation node A: sorting the data set in an ascending order according to values on the segmentation domain S, and taking a median as the segmentation node A.

(3.1.3) Determining left and right subtrees: performing data segmentation according to the segmentation node A, classifying all data objects smaller than or equal to the segmentation node A into the left subtree, and classifying all data objects larger than the segmentation node A into the right subtree.

(3.1.4) Repeating the step (3.1.2) to the step (3.1.3) until all data objects are classified.

Further, the dispersion rate represents a deviation between scores of a reviewer for different review objects and an average score of various review objects, and a calculation formula thereof satisfies:

$$c_i = \frac{1}{m-1} \sum_{i=1}^{m-1} (x'_{ij} - \overline{x}'_i)^2$$

where $c_i$ represents the dispersion rate of a reviewer i; $x_{ij}'$ represents a degree of difference of the reviewer i on reviewees j; $x_{ij}'=x_{ij}-x_j(\text{mid})$, $\overline{x}_i'$ represents an average value of $$x'_{ij}; \overline{x}'_i = \frac{1}{m-1} \sum_{i=1}^{m-1} x'_{ij};$$

m represents a number of people participating in the review.

Further, the step (5) includes the following sub-steps:

(5.1) Extracting feature values from a data set of the structured scoring data and generating a structured matrix; in some embodiments, the feature values include a correlation coefficient, a difference consistency and the dispersion rate; each row in the structured matrix represents a sample, and each column represents a feature value variable.

(5.2) Calculating a covariance matrix of feature variables according to the structured matrix to detect the correlation of the feature values, and if the detected correlation is greater than a correlation threshold, removing the influence of the correlation between the feature variables with a principal component analysis method.

(5.3) Clustering by using the feature values and calculating an average value of achievable density ratios of different data objects to nearest neighbors thereof to determine an anomaly degree of the data objects, and adding the abnormal data objects into the third abnormal data set.

Further, the step (6) includes the following sub-steps:

(6.1) Acquiring data to be corrected from the first abnormal data set, the second abnormal data set and the third abnormal data set.

(6.2) Calculating an information entropy from the historical scoring data, and correcting the final scoring result according to the information entropy and abnormal scoring data.

Further, the step (7) includes the following sub-steps:

(7.1) Generating the reviewer ability evaluation report: calculating variation coefficients of different reviewers according to the second abnormal data set, generating corresponding scoring weights for different reviewers with a factor weight method, obtaining final scoring results of different reviewers with a weighted average method according to the scoring weights of different reviewers, and establishing a feedback mechanism to realize a dynamic adjustment of the scoring weights.

(7.2) Generating the abnormal scoring correction report: calculating weighted average scores of different reviewers as the final scoring results according to correction results of the abnormal data sets and reviewer score weights in the reviewer ability evaluation report, and displaying the final scoring results of the abnormal scoring data before and after correction in a form of a report.

A second aspect of an embodiment of that present invention provides a device for detecting and correcting abnormal scoring of peer reviews, the device is used for implementing the above method for detecting and correcting abnormal scoring of peer reviews, and includes:

A data acquisition unit configured for obtaining peer review data sets in a specific time period from an enterprise personnel performance appraisal database, in some embodiments, the data set includes information of at least one reviewer.

A data cleaning unit configured for converting original scoring data into structured scoring data, and performing data missing value filling and data normalization processing on the structured scoring data.

An abnormal data detection unit configured for performing one-way abnormal detection, consistency detection and two-way abnormal detection on the cleaned structured scoring data.

An anomaly data set acquisition unit configured for storing anomaly detection results of the one-way anomaly detection, the consistency detection and the two-way anomaly detection.

An abnormal data set correction unit configured for correcting abnormal data obtained in the first abnormal data set, the second abnormal data set and the third abnormal data set.

A report generation unit configured for generating a reviewer ability evaluation report and an abnormal scoring correction report.

The method has the beneficial effects that the distance-based abnormal data detection method and the density-based abnormal data detection method are organically combined for the first time, the features of abnormal data are expressed to the greatest extent through feature value extraction, and the rapid retrieval of abnormal data is realized by using an index structure; when repairing abnormal data, the present application uses information entropy to correct abnormal data, establishes a circular feedback mechanism, and dynamically adjusts the scoring weight of reviewers to obtain a final weighted scoring result; according to the present application, the abnormal scoring can be detected and corrected in the peer review process, which, on the one hand, realizes the correction of abnormal scoring results, and on the other hand, effectively constrains the scoring behavior of reviewers, so that the fairness, impartiality and objectivity of peer reviews results are ensured.

DESCRIPTION OF EMBODIMENTS

The technical solution in the embodiment of the present application will be clearly and completely described below with reference to the attached drawings. Obviously, the described embodiment is only a part of the embodiment of the present application, but not the whole embodiment. Based on the embodiments in the present application, all other embodiments obtained by those skilled in the art without creative work belong to the scope of protection of the present application.

Figure 1:
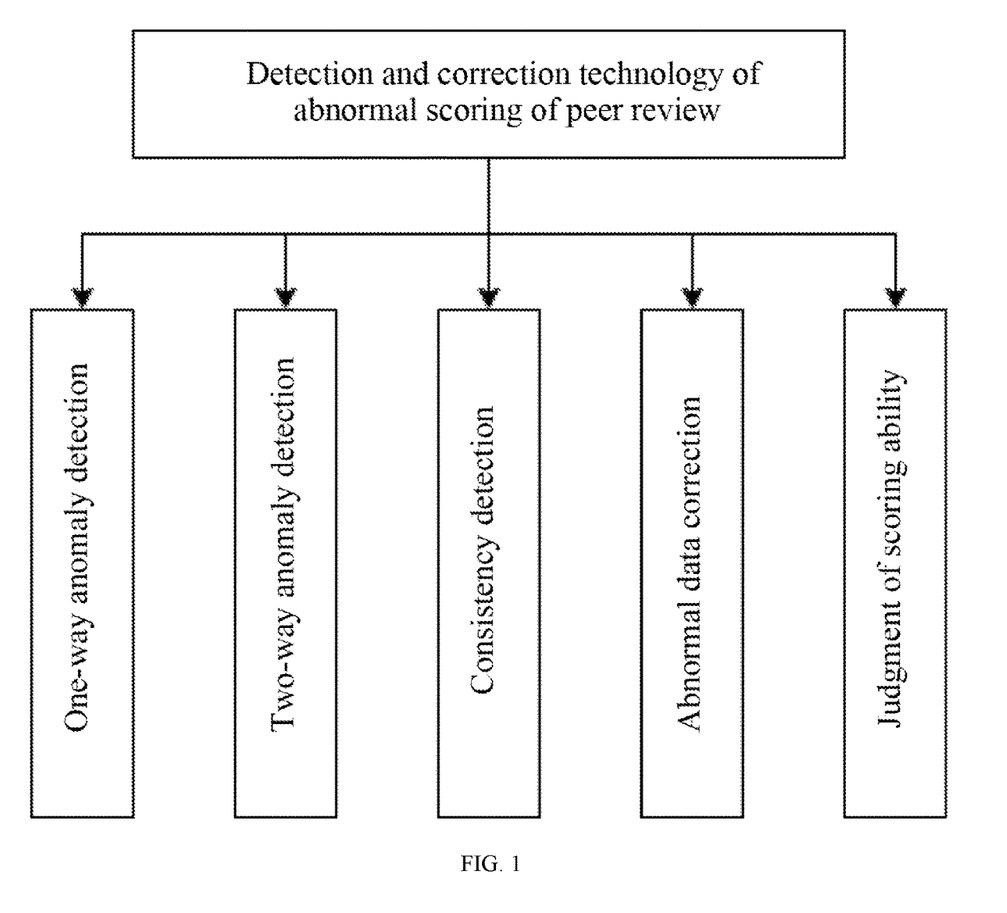
FIG. 1 is a general frame diagram of an embodiment of the present application.

The method for detecting and correcting abnormal scoring of peer reviews in the present application obtains abnormal data sets through a one-way abnormal value detection method based on distance and a two-way outlier detection method based on cluster analysis, and corrects the abnormal data by using information entropy parameters, as shown in FIG. 1, so as to ensure fairness, fairness and objectivity of the review link.

Figure 2:
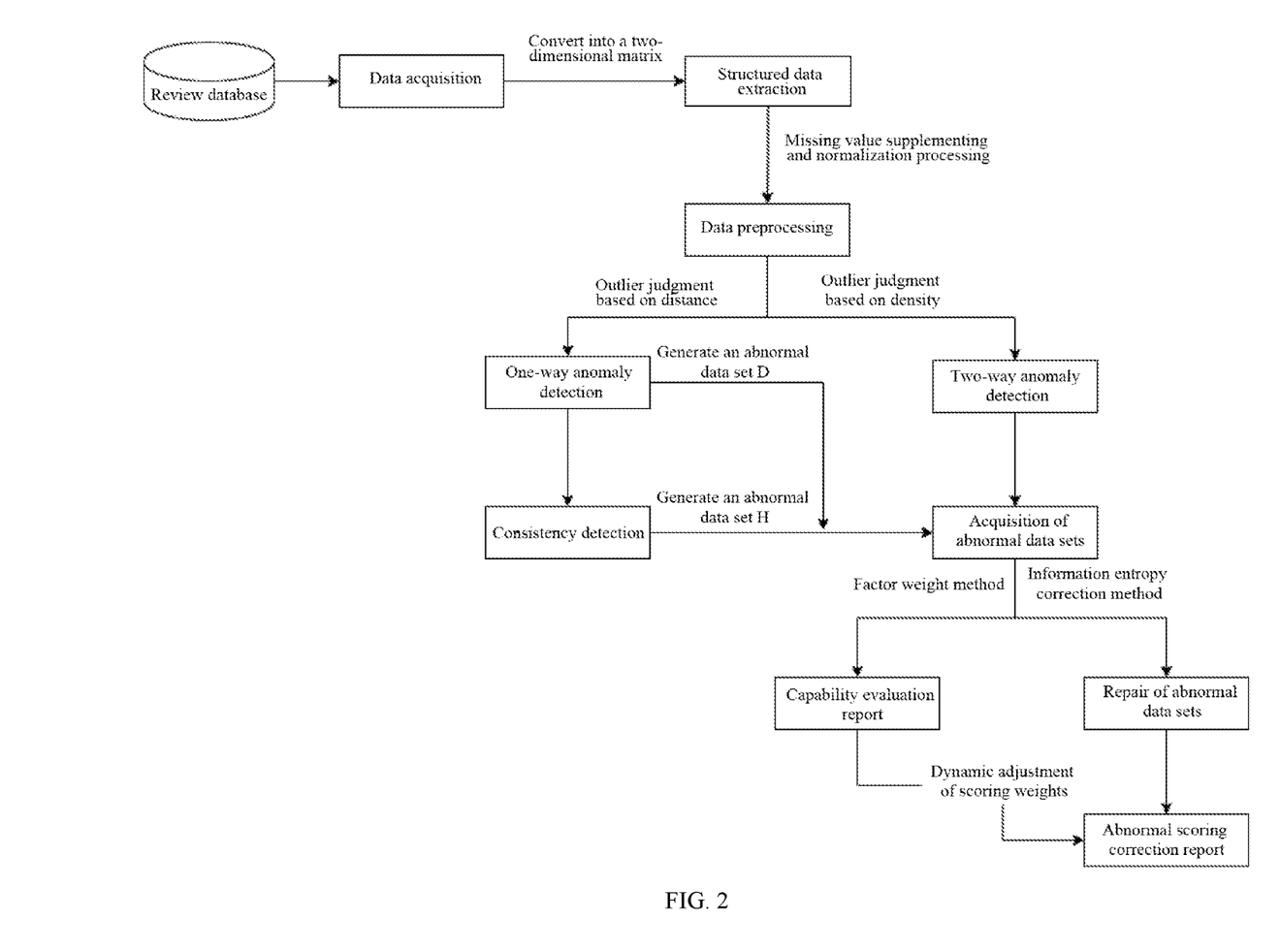
FIG. 2 is an overall flow chart of an embodiment of the present application.

In this embodiment, as shown in FIG. 2, the detection and correction method includes the following steps:

(1) Acquiring scoring data: peer review data sets are collected from an enterprise personnel performance appraisal database to obtain the scoring data, and structural transformation is carried on the original data information of the scoring data to obtain structured scoring data.

The original data information includes review time, reviewer number, reviewee number and scoring result.

Specifically, the original data information of the collected scoring data is converted into a two-dimensional structured data form. The row label and the column label correspond to the reviewees and reviewers who participated in this meeting respectively. It is assumed that there are m participants in this review, $x_{i,j}$ represents the score of a reviewer i on the reviewee j. Because the self-review score does not participate in the mutual review process, when i=j, $x_{i,j}$=0. The final structured scoring data form is as follows:

$$X = \begin{bmatrix} x_{1,1} & x_{1,2} & \cdots & x_{1,m} \\ x_{2,1} & x_{2,2} & \cdots & x_{2,m} \\ \cdots & \cdots & \ddots & x_{n-1,m} \\ x_{m,1} & x_{m,2} & \cdots & x_{m,m} \end{bmatrix}$$

It should be appreciated that when there are multiple reviews, the review time can also be added, and the scoring data can be structured according to the review time and other original data information.

(2) Cleaning the scoring data: the structured scoring data obtained in the step (1) is cleaned by a data cleaning method; a data cleaning process includes data missing value filling and data normalization processing.

In this embodiment, filling the structured scoring data with missing values is specifically as follows: using historical scoring data to calculate the average value to replace the missing values in the current period for filling. For example, if the latest peer review data is extracted, the data of the score of the reviewer 2 on the reviewee 1 is missing, that is, in step (1), $x_{2,1}$=NAN, the data of the latest five peer reviews are extracted, and the average value of the five historical scorings of the reviewer 2 on the reviewee 1 is calculated, namely, $$\overline{x_{2,1}} = \sum_{t=1}^{5} x(t)_{2,1},$$

to replace the missing value $x_{2,1}$. It should be appreciated that the number of times of the recent historical scoring data can be selected according to the actual situation.

In this embodiment, the structured scoring data is subjected to data normalization, and the specific method is: the scoring data are uniformly mapped to the [0, 1] interval by a maximum-minimum normalization method or a Z-score method, and the scoring data are arranged in an ascending order by columns. For example, if the scoring range is between 1 and 10 points, that is, $0 \leq x_{i,j} \leq 10$ (when i=j, $x_{i,j}$=0), the maximum-minimum standardization method is used to uniformly map $x_{i,j}$ to the [0, 1] interval, that is $$\hat{x}_{i,j} = \frac{x_{i,j} - \min(x_j)}{\max(x_j) - \min(x_j)},$$

where $x_j$ represents the $j^{th}$ column in the structured matrix. It should be appreciated that the max-min standardization method and the Z-score method are both methods to standardize data, and other methods such as Decimal scaling standardization can be adopted.

The maximum-minimum standardization method is to linearly transform the data to make it fall into a small specific interval. For the convenience of data processing, the number can be changed into a decimal between [0, 1], which is a commonly used method of data standardization and will not be repeated here.

The Z-score method is used to standardize the data based on the mean and standard deviation of the original data. The Z-score method is suitable for cases where the maximum and minimum values are unknown, or there are outliers beyond the range of values. This is a commonly used method for data standardization, and will not be repeated here.

(3) One-way anomaly detection: one-way anomaly detection is performed on each column of one-way scoring results in the structured scoring data, and detected abnormal data objects are added into a first abnormal data set.

In the structured scoring data, each column corresponds to the scoring results of other reviewers on the same review object, that is, the one-way scoring results. In order to judge whether the one-way scoring result is abnormal, an index structure can be used to search the adjacent points of each data object $x_{i,j}$ in each column within the D range. Assuming that the threshold value M is the maximum number of data objects allowed to be included in the D-neighborhood of an outlier, that is, if M+1 or more neighboring points are found in the D-neighborhood of a data object $x_{i,j}$, it is judged that $x_{i,j}$ is not an outlier.

Figure 3:
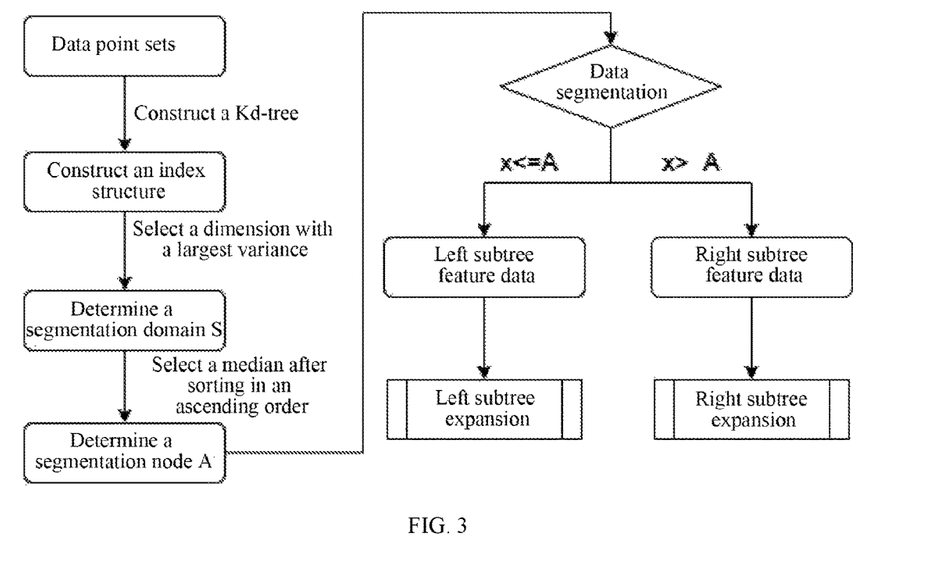
FIG. 3 is a flowchart of a one-way anomaly detection index structure according to an embodiment of the present application.

(3.1) An index structure is constructed according to the data set of structured scoring data, and the index structure is a Kd-tree. The index structure uses a k-d tree to search each column. The specific steps are shown in FIG. 3.

(3.1.1) Determining a segmentation domain S: a variance of the data set in each dimension is calculated, and a dimension with a largest variance is selected as the segmentation domain S; in this embodiment, the data set consists of three dimensions: the reviewer i, the reviewee j and a scoring result $x_{i,j}$, that is, dim(i, j, $x_{i,j}$), the variance of each dimension is calculated, and the dimension with the largest variance is selected as the segmentation domain S, so that data segmentation in this direction will achieve a higher resolution.

(3.1.2) Determining a segmentation node A: the data set is sorted in an ascending order according to values on the segmentation domain S, and a median is taken as the segmentation node A.

(3.1.3) Determining left and right subtrees: data segmentation is performed according to the segmentation node A, all data objects smaller than or equal to the segmentation node A are classified into the left subtree, and all data objects larger than the segmentation node A are classified into the right subtree.

(3.1.4) Step (3.1.2) to step (3.1.3) are repeated until all data objects are classified. It should be appreciated that after the completion of the Kd-tree construction, there will be multi-level Kd-subtrees.

(3.2) Outlier mining: firstly, a query path is established, and whether to backtrack a current node is determined by calculating a distance between a query node and a current nearest node; if the current distance is less than or equal to a set distance threshold D, the current node is backtracked until the distance between a backtrack node and the query node is greater than the set distance threshold D; secondly, outliers are determined, a number m 1 of data objects contained in a D-neighborhood of the current query node is counted, and it is determined that the current query node as an outlier if the number m 1 of data objects contained is less than the threshold M; in some embodiments, the threshold M is a maximum number of data objects allowed to be included in the D-neighborhood of the outlier.

In this embodiment, the distance threshold d can be calculated by the following formula:

$$D = \frac{x_j(\max) - x_j(\text{mid})}{\sqrt{\frac{\sum_{j=1}^{m}(x_j(\max) - x_j(\text{mid}))^2}{m}}}$$

where $x_j(\max)$ represents the maximum value of the $j^{th}$ column, $x_j(\text{mid})$ represents the median value of the $j^{th}$ column, and m represents that there are m participants in this review.

(3.3) Step (3.2) is repeated to complete the one-way anomaly detection of each data object in each column in turn, and the detected abnormal data objects are added into the first abnormal data set.

It should be noted that m in the denominator of the distance threshold D decreases with the increase of the number of detected columns, and the current m=m−n, where n is the number of detected columns.

(4) Consistency detection: consistency detection is carried out by adopting a dispersion rate, and the detected abnormal data objects are added into the second abnormal data set.

The dispersion rate represents a deviation between the scores of the reviewer for different review objects and an average score of various review objects. The greater the dispersion rate, the greater the subjective volatility, and the more likely there is unfairness.

The dispersion rate of the reviewer i is calculated and the calculation formula is as follows:

$$c_i = \frac{1}{m-1}\sum_{i=1}^{m-1}(x'_{ij} - \overline{x}'_i)^2$$

where $c_i$ represents the dispersion rate of a reviewer i; $x_{ij}'$ represents a degree of difference of the reviewer I on reviewees j; $x_{ij}'=x_{ij}-x_j(\text{mid})$, $\overline{x}_i'$ represents an average value of $$x'_{ij}; \overline{x}'_i = \frac{1}{m-1}\sum_{i=1}^{m-1}x'_{ij};$$

m represents a number of people participating in the review.

It should be noted that according to the 3 sigma principle, the data objects with high dispersion rates are regarded as abnormal data objects, and the detected abnormal data objects are added to the second abnormal data set.

It should be appreciated that a 3 sigma principle, also known as the rule of thumb, is used to calculate the normal distribution data of the average value and standard deviation of the dispersion rate, and then judge whether the dispersion rate is too high. This is a commonly used probability statistical method, which is not repeated here.

(5) Two-way anomaly detection: two-way anomaly detection is performed on the structured scoring data, and the detected abnormal data objects are added to the third abnormal data set.

The peer review data set includes not only the scoring results of different reviewers to the same review object, but also the scoring results of the same reviewer to different review objects, i.e., a two-way scoring behavior.

(5.1) Feature values are extracted from the data set of the structured scoring data and a structured matrix is generated; he feature values include correlation coefficient, difference consistency and dispersion rate; each row in the structured matrix represents a sample, and each column represents a feature value variable.

Specifically, the feature value can be extracted according to the relevant formula of the feature value, and the relevant expression is as follows: The expression of the dispersion rate satisfies:

$$c_i = \frac{1}{m-1}\sum_{i=1}^{m-1}(x'_{ij} - \overline{x}'_i)^2$$

where $c_i$ represents the dispersion rate of a reviewer i; $x_{ij}'$ represents a degree of difference of the reviewer i on reviewees j; $x_{ij}'=x_{ij}-x_j(\text{mid})$, $\overline{x_i}'$ represents an average value of $$x_{ij}'; \overline{x_i}' = \frac{1}{m-1}\sum_{i=1}^{m-1} x_{ij}';$$

m represents a number of people participating in the review.

The expression of the rank correlation coefficient satisfies:

$$r_i = 1 - \frac{6\sum_{i=1}^{m} d_i^2}{n^3 - n}$$

where, $r_i$ represents the rank correlation coefficient of the reviewer i, $d_i$ represents the difference of ranking levels, n represents the number of detected columns, and m represents the number of people participating in the review.

The expression of the difference consistency satisfies:

$$\delta_i = \frac{1}{n}\sum_{j=1}^{n} |\vartheta_{ij}|$$

where $\delta_i$ represents the difference consistency of the reviewer i; $\vartheta_{ij}=|x_{ij}-\overline{x_j}|$, $x_{ij}$ represents the score of the reviewer i on the reviewee j, $\overline{x_j}$ represents the average value of all raters to the reviewee j, and n represents the number of detected columns.

(5.2) A covariance matrix of feature variables is calculated according to the structured matrix to detect the correlation of the feature values, and if the detected correlation is greater than a correlation threshold, the correlation between the feature variables is eliminated by a principal component analysis method.

It should be appreciated that if there is a strong correlation between variables, it is not conducive to the final classification effect, therefore it is necessary to eliminate the correlation between feature value variables.

In this embodiment, the correlation threshold value V=0.2.

In this embodiment, the principal component analysis method is used to eliminate the correlation between feature value variables, specifically, the original feature value variables are mapped to the low-latitude space with the aid of orthogonal transformation, so as to ensure that different feature value variables are orthogonal to each other, thereby removing the influence of the correlation of the original feature value variables.

(5.3) Clustering is performed by using the feature values and an average value of achievable density ratios of different data objects to nearest neighbors thereof is calculated to determine the anomaly degree of the data objects, and the abnormal data objects are added into the third abnormal data set.

Figure 4:
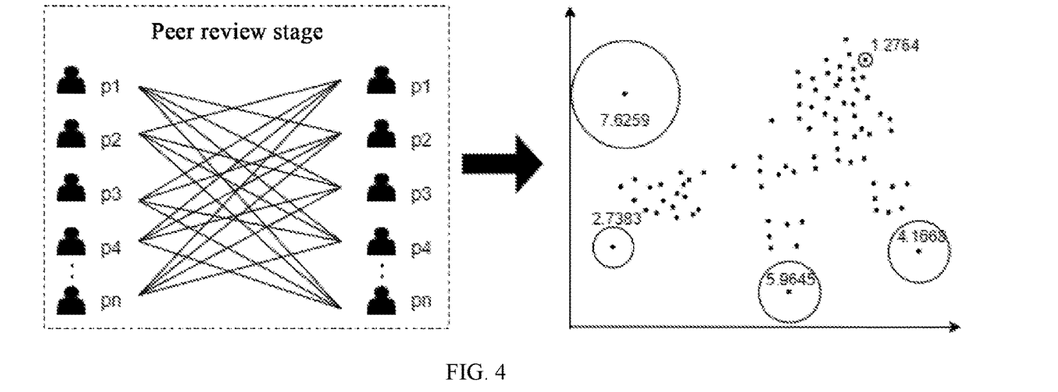
FIG. 4 is an effect diagram of two-way anomaly detection according to an embodiment of the present application.

Outlier mining: in the density-based anomaly detection method, a Local Outlier Factor (LOF) judges the anomaly degree of the object by calculating average value of achievable density ratios of different data objects to nearest neighbors thereof. The closer the LOF is to 1, the higher the anomaly degree of the data object, otherwise, the anomaly degree of the data object is lower.

Finally, the outliers are displayed in a visual form, as shown in FIG. 4, where the X-axis and Y-axis represent the top two feature vectors respectively, and the circled objects are outliers.

(6) Abnormal data set repair: the first abnormal data set, the second abnormal data set and the third abnormal data set are repaired.

(6.1) The data to be corrected are acquired from the first abnormal data set, the second abnormal data set and the third abnormal data set.

(6.2) An information entropy is calculated from the historical scoring data, and the final scoring result is corrected according to the information entropy and abnormal scoring data.

It should be appreciated that information entropy is usually used to measure the expected value of random variables. The more chaotic the system information is, the greater the information entropy value is.

For the abnormal data set, the information entropy correction method is used to repair the abnormal data set. On the basis of the current abnormal score, the information entropy based on the historical average deviation is added to compensate and correct the results. The correction formula is as follows:

$$Y = X + (\overline{M} - H\overline{S})$$

where X represents the abnormal score, H represents the information entropy of a historical deviation, $\overline{M}$ represents the difference between the abnormal score of the reviewer and the average score of the reviewer, and $\overline{S}$ represents the historical average deviation of the reviewer.

(7) Generating an evaluation report: the evaluation report includes two parts, namely, the reviewer ability evaluation report and the abnormal scoring correction report.

(7.1) Generating the reviewer ability evaluation report: the variation coefficients of different reviewers are calculated according to the second abnormal data set, and the corresponding scoring weights are generated for different reviewers with a factor weight method; the final scoring results of different reviewers are obtained with a weighted average method according to the scoring weights of different reviewers, and a feedback mechanism is established to realize a dynamic adjustment of the scoring weights.

The reviewer ability evaluation report includes reviewer number, number of reviews, historical average deviation, ability grade and scoring weight, as shown in Table 1.

TABLE 1

| Reviewer ability evaluation report | | | | |
| --- | --- | --- | --- | --- |
| Reviewer number | Number of reviews | Historical average deviation | Ability grade | Scoring weight |
| P001 | 5 | 1.68 | 1 | 0.08 |
| P001 | 6 | 0.85 | 2 | 0.15 |
| ... | ... | ... | ... | ... |
| P010 | 4 | 0.92 | 2 | 0.15 |

(7.2) Generating the abnormal scoring correction report: the weighted average scores of different reviewers are calculated as the final scoring results according to correction results of the abnormal data sets and reviewer score weights in the reviewer ability evaluation report, and the final scoring results of the abnormal scoring data before and after correction are displayed in a form of a report. As shown in Table 2, 0.65, the score of the reviewer P001 on the reviewee P002, is the detected abnormal score.

TABLE 2

Comparison table of abnormal score before and after correction

| | Reviewer number | | | | | Scoring result |
|---|---|---|---|---|---|---|
| | P001 | P002 | P003 | ... | P010 | |
| P001 | 0.85 | 0.65 | 0.86 | 0.90 | 0.88 | 0.84 |
| P001-after correction | 0.85 | 0.78 | 0.86 | 0.90 | 0.88 | 0.86 |
| ... | ... | ... | ... | ... | ... | ... |

It is worth mentioning that the present application also provides a device for detecting and correcting the abnormal scoring of peer reviews, which is used to implement the above-mentioned method for detecting and correcting the abnormal scoring of peer reviews.

Figure 5:
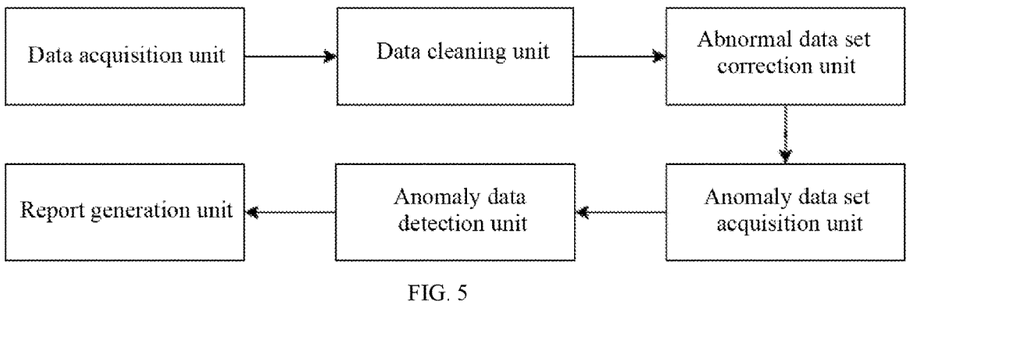
FIG. 5 is a schematic structural diagram of a device for detecting and correcting abnormal scoring of peer reviews according to an embodiment of the present application.

As shown in FIG. 5, the detection and correction device includes a data acquisition unit, a data cleaning unit, an abnormal data detection unit, an abnormal data set acquisition unit, an abnormal data set correction unit and a report generation unit.

In this embodiment, the data acquisition unit is used for acquiring peer review data sets in a specific time period from an enterprise personnel performance appraisal database, in some embodiments, the data set includes information of at least one reviewer.

In this embodiment, the data cleaning unit is used for converting original scoring data into structured scoring data, and performing data missing value filling and data normalization processing on the structured scoring data.

In this embodiment, the abnormal data detection unit is used for performing one-way abnormal detection, consistency detection and two-way abnormal detection on the cleaned structured scoring data.

In this embodiment, the anomaly data set acquisition unit is used for storing anomaly detection results of the one-way anomaly detection, the consistency detection and the two-way anomaly detection.

In this embodiment, the abnormal data set correction unit is used for correcting abnormal data acquired in the first abnormal data set, the second abnormal data set and the third abnormal data set.

In this embodiment, the report generation unit is used for generating a reviewer ability evaluation report and an abnormal scoring correction report.

Figure 6:
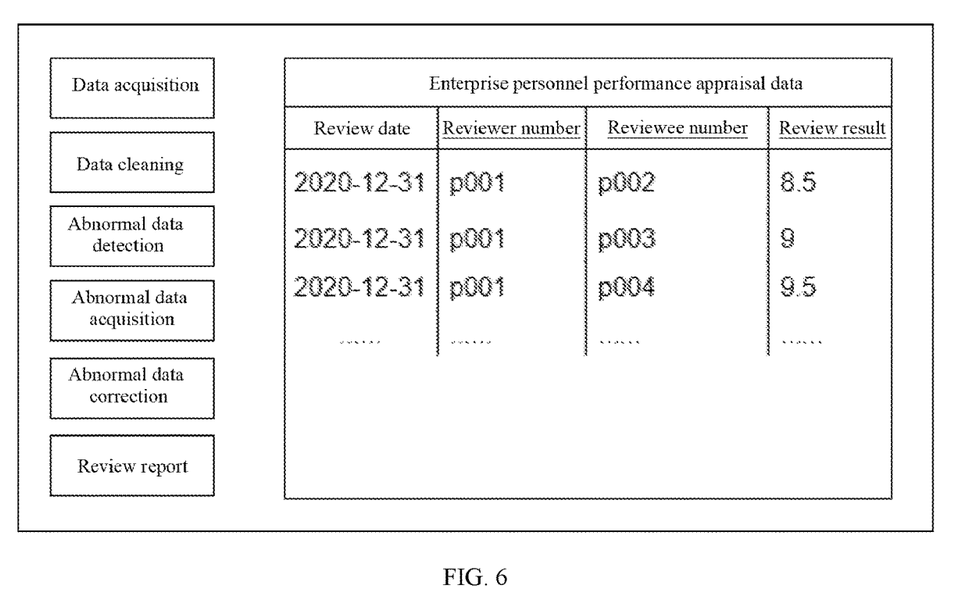
FIG. 6 is a visual interface of the detection and correction device in a terminal device according to the embodiment of the present application.

The device for detecting and correcting abnormal scoring of peer reviews in the embodiment of the present application can be implemented on a computer terminal through a visual interface, and includes the following functions:

(1) Data extraction, which is used to obtain a peer review data set in a specific time period from the enterprise personnel performance appraisal database, in some embodiments, the data set includes information of at least one reviewer; the extracted data set can be displayed in a tabular form through the visual interface of the computer terminal, as shown in FIG. 6.

(2) Data cleaning, which is used to convert the original scoring data into structured data, and to fill in the missing data and normalize the data for the structured scoring data.

(3) Abnormal data detection, which is used for one-way anomaly detection, consistency detection and two-way anomaly detection of cleaned structured data.

(4) Anomaly data set acquisition, which is used to store anomaly detection results of one-way anomaly detection, consistency detection and two-way anomaly detection.

(5) Abnormal data set correction, which is used to correct the abnormal data sets obtained in the first abnormal data set, the second abnormal data set and the third abnormal data set.

(6) Generation of an evaluation report, which includes a reviewer ability evaluation report and an abnormal scoring correction report.

It should be appreciated that it can be visualized not only on computer terminals, but also on other terminal devices, such as tablet computers and notebooks.

The above embodiments are only used to illustrate, rather than to limit the technical solution of the present application; although the present application has been described in detail with reference to the foregoing embodiments, those skilled in the art should understand that it is still possible to modify the technical solution described in the foregoing embodiments, or to replace some technical features with equivalents; however, these modifications or substitutions do not make the essence of the corresponding technical solutions deviate from the spirit and scope of the technical solutions of various embodiments of the present application.

What is claimed is:

1. A method for detecting and correcting abnormal scoring of peer reviews, comprising:

step (1): acquiring scoring data: collecting peer review data sets from an enterprise personnel performance appraisal database to obtain the scoring data, and performing structural transformation on original data information of the scoring data to obtain structured scoring data;

step (2): cleaning the scoring data: cleaning the structured scoring data obtained in the step (1) with a data cleaning method, wherein a data cleaning process comprises data missing value filling and data normalization processing;

step (3): one-way anomaly detection: performing one-way anomaly detection on each column of one-way scoring results in the structured scoring data, and adding detected abnormal data objects into a first abnormal data set;

wherein the step (3) comprises:

sub-step (3.1): constructing an index structure according to a data set of the structured scoring data, wherein the index structure is a Kd-tree;

sub-step (3.2): outlier mining: establishing a query path, and determining whether to backtrack a current node by calculating a distance between a query node and a current nearest node; if the distance is less than or equal to a set distance threshold D, backtracking the current node until the distance between a backtrack node and the query node is greater than the set distance threshold D; determining outliers, counting a number ml of data objects contained in a D-neighborhood of current query node, and determining the current query node as an outlier if the number ml of data objects contained in the D-neighborhood is less than a threshold M; wherein the threshold M is a maximum number of data objects allowed to be contained in the D-neighborhood of the outlier; and sub-step (3.3): repeating the sub-step (3.2) to sequentially complete the one-way anomaly detection of each data object in each column in the structured scoring data, and adding the detected abnormal data objects into the first abnormal data set;

step (4): consistency detection: performing consistency detection using a dispersion rate, and adding the detected abnormal data objects into a second abnormal data set; wherein the dispersion rate represents a deviation between scores of a reviewer for different review objects and an average score of various review objects, and a calculation formula of the dispersion rate satisfies:

$$c_i = \frac{1}{m-1} \sum_{i=1}^{m-1} (x'_{ij} - \overline{x'_i})^2$$

where $c_i$ represents the dispersion rate of a reviewer i; $x_{ij}'$ represents a degree of difference of the reviewer i on a reviewee j; $x_{ij}'=x_{ij}-x_j(\text{mid})$, $\overline{x_i'}$ represents the average score of $x_{ij}'$; $x_i'=1/m-1\Sigma_{i=1}^{m-1}x_{ij}'$; m represents a number of people participating in the review;

step (5): two-way anomaly detection: performing two-way anomaly detection on the structured scoring data, and adding the detected abnormal data objects into a third abnormal data set; wherein the step (5) comprises:

sub-step (5.1): extracting feature values from a data set of the structured scoring data and generating a structured matrix; wherein the feature values comprise a correlation coefficient, a difference consistency and the dispersion rate; each row in the structured matrix represents a sample, and each column represents a feature value variable;

sub-step (5.2): calculating a covariance matrix of feature variables according to the structured matrix to detect a correlation of the feature values, and if the correlation is greater than a correlation threshold, removing an influence of the correlation between the feature variables with a principal component analysis method; and sub-step (5.3): clustering by using the feature values and calculating an average value of achievable density ratios of different data objects to nearest neighbors of the different data objects to determine an anomaly degree of the different data objects, and adding abnormal data objects into the third abnormal data set;

step (6): abnormal data set repair: performing abnormal data repair for the first abnormal data set, the second abnormal data set and the third abnormal data set; and step (7): generating an evaluation report: the evaluation report comprises a reviewer ability evaluation report and an abnormal scoring correction report.

2. The method for detecting and correcting abnormal scoring of peer reviews according to claim 1, wherein the original data information comprises review time, reviewer number, reviewee number and scoring result.

3. The method for detecting and correcting abnormal scoring of peer reviews according to claim 1, wherein the data missing value filling comprises: calculating an average value from historical scoring data to replace missing values in a current period for filling;

the data normalization processing comprises: uniformly mapping the scoring data to [0, 1] intervals by using a maximum-minimum normalization method or a Z-score method, and arranging the scoring data in an ascending order by columns.

4. The method for detecting and correcting abnormal scoring of peer reviews according to claim 1, wherein the sub-step (3.1) comprises:

sub-step (3.1.1): determining a segmentation domain S: calculating a variance of the data set in each dimension, and selecting a dimension with a largest variance as the segmentation domain S;

sub-step (3.1.2): determining a segmentation node A: sorting the data set in an ascending order according to values on the segmentation domain S, and taking a median as the segmentation node A;

sub-step (3.1.3): determining left and right subtrees: performing data segmentation according to the segmentation node A, classifying all data objects smaller than or equal to the segmentation node A into the left subtree, and classifying all data objects larger than the segmentation node A into the right subtree; and sub-step (3.1.4): repeating the sub-step (3.1.2) to the sub-step (3.1.3) until all data objects are classified.

5. The method for detecting and correcting abnormal scoring of peer reviews according to claim 1, wherein the step (6) comprises:

sub-step (6.1): acquiring data to be corrected from the first abnormal data set, the second abnormal data set and the third abnormal data set; and sub-step (6.2): calculating an information entropy from historical scoring data, and correcting final scoring result according to the information entropy and abnormal scoring data.

6. The method for detecting and correcting abnormal scoring of peer reviews according to claim 1, wherein the step (7) comprises:

sub-step (7.1): generating the reviewer ability evaluation report: calculating variation coefficients of different reviewers according to the second abnormal data set, generating corresponding scoring weights for different reviewers with a factor weight method, obtaining final scoring results of different reviewers with a weighted average method according to the scoring weights of different reviewers, and establishing a feedback mechanism to realize a dynamic adjustment of the scoring weights; and sub-step (7.2): generating the abnormal scoring correction report: calculating weighted average scores of different reviewers as the final scoring results according to correction results of the abnormal data sets and reviewer score weights in the reviewer ability evaluation report, and displaying the final scoring results of the abnormal scoring data before and after correction in a form of a report.

7. A device for detecting and correcting abnormal scoring of peer reviews, the device is used for implementing the method for detecting and correcting abnormal scoring of peer reviews according to claim 1, and comprises:

a data acquisition unit configured for obtaining peer review data sets in a specific time period from an enterprise personnel performance appraisal database, wherein the peer review data sets comprise information of at least one reviewer;

a data cleaning unit configured for converting original scoring data into structured scoring data, and performing data missing value filling and data normalization processing on the structured scoring data;

an abnormal data detection unit configured for performing one-way abnormal detection, consistency detection and two-way abnormal detection on cleaned structured scoring data;

an anomaly data set acquisition unit configured for storing anomaly detection results of the one-way anomaly detection, the consistency detection and the two-way anomaly detection;

an abnormal data set correction unit configured for correcting abnormal data obtained in the first abnormal data set, the second abnormal data set and the third abnormal data set; and a report generation unit configured for generating a reviewer ability evaluation report and an abnormal scoring correction report.

\* \* \* \* \*